United States Patent Office 3,507,692
Patented Apr. 21, 1970

3,507,692
SENSITIZATION OF PHOTOCONDUCTIVE MATERIAL
Theofiel Hubert Ghys, Kontich, and Karel E. Verhille, Mortsel-Antwerp, Belgium, assignors to Gevaert-Agfa N.V., Mortsel, Belgium, a Belgian company
No Drawing. Filed Apr. 5, 1967, Ser. No. 628,551
Claims priority, application Great Britain, Apr. 5, 1966, 15,149/66
Int. Cl. G03g 5/08, 5/00
U.S. Cl. 117—201
12 Claims

ABSTRACT OF THE DISCLOSURE

An electrophotographic plate is prepared by applying a layer of photoconductive material to a support. The photoconductive material is applied from a composition containing an aqueous dispersion of an inorganic photoconductor and a resin binder. A sensitizing dye and a low vapor pressure organic solvent are added to photoconductive material during the preparation of the composition so that the dye and the solvent are present during the drying of the plate. The solvent has an evaporation time of at least 35 compared with ethyl ether.

---

The present invention relates to an improvement in the sensitization of photoconductive materials.

Photoconductive coatings containing a finely divided photoconductive substance, e.g. photoconductive zinc oxide dispersed in a binder, are well known, among others from the United States patent specifications 2,197,552 by Joseph N. Kuzmick, issued Apr. 16, 1940; 2,297,691 by Chester F. Carlson, issued Oct. 6, 1942; 2,485,589 by Frank Gray, issued Oct. 25, 1949; 2,551,582 by Chester F. Carlson, issued May 8, 1951 and 2,599,542 by Chester F. Carlson, issued June 10, 1952 and from the United Kingdom patent specifications 566,278 filed June 21, 1943 by Siegfried Rothschild and Cathodeon Ltd; 693,112 filed May 9, 1950 by The Battelle Development Corp. and 700,502 filed Apr. 26, 1949 by Office National d'Etudes et de Recherces Aéronautiques.

According to existing techniques, the photoconductive binder coatings are prepared by dispersing or dissolving the photoconductive substances in a solution of an insulating binder, and by applying them as such in the form of a layer to an appropriate relatively conductive support.

According to existing techniques inorganic photoconductive substances such as photoconductive zinc oxide can be sensitized by means of various organic dyes, see e.g. United States patent specification 3,128,179 by William B. Kendall and Paul H. Stewart, issued Apr. 7, 1964 and the sensitizing dyes described in Belgian patent specification 612,102 filed Dec. 29, 1961 by Gevaert Photo-Producten N.V.

It has been observed that the sensitizing power of known sensitizing agents for photoconductive zinc oxide coated from aqueous media is very low compared with their activity in a photoconductive layer applied from an organic solvent and containing one or more hydrophobic binding agents.

It is an object of the present invention to remedy this deficiency and more particularly to enhance the sensitizing activity of sensitizing dyes for inorganic photoconductive substances as e.g. the oxides, sulphides or selenides of zinc, cadmium, titanium, mercury, antimony, bismuth and lead in aqueous media.

According to the invention, this object is achieved by incorporating an organic sensitizing dye in an aqueous meuium containing an inorganic photoconductive substance in the presence of an organic liquid which consists of or contains a solvent which has a very low vapour pressure and which is at least for 20% by weight soluble in water at 20° C. Only one such low vapour-pressure solvent, or a mixture of such solvents, may be used.

The said low vapour-pressure solvent(s) may be used in combination with one or more other solvents. For example the sensitizing dye may initially be incorporated in the coating composition while such dye is dissolved in a solvent with high vapour pressure, and the low-vapour-pressure-solvent may be added to the composition before, simultaneously or after the dissolved dye has been mixed with the photoconductor dispersed or dissolved in the aqueous medium. The important point is that the low vapour-pressure solvent should be available at least during the drying of the coating so that the dye may be held in this solvent until after the high vapour-pressure solvent (if used) has evaporated or substantially so, and the coating has otherwise substantially dried.

The evaporation time or period which is a measure for the vapour pressure of the low vapour-pressure solvent should preferably be higher than 35, taking the time required for evaporating the same volume of diethyl ether as unity. For a review of evaporation periods see Thos. H. Durrans, Solvents, D. Van Nostrand Co. Inc. New York 250, Fourth Avenue (1946) fifth edition, pp. 39–40.

Preferably the low-vapour-pressure solvent or mixture of such solvents is used in a ratio of at least 2% by volume in respect of the volume of the whole coating composition.

The boiling point of the low-vapour-pressure solvent or mixture of solvents should preferably not be higher than 180° C. at 760 mm. Hg thus enabling a relatively easy removal of the solvent(s).

A low-vapour-pressure solvent which is preferably used is diacetone alcohol since it very markedly improves the sensitization by an organic sensitizing dye of an inorganic photoconductive substance applied in aqueous medium and can be easily and practically completely removed from the photo-conductive coating by drying it.

Other low-vapour-pressure solvents which are suited for use according to the present invention are: tetrahydrofurfuryl alcohol, ethylene glycol monoacetate, methyl glycol acetate and ethyl glycol acetate. Their removal by evaporation from the photoconductive coating is somewhat more difficult than in the case for diacetone alcohol, but traces of these solvents left in the photoconductive coating do not harm the photographic properties.

Suitable mixtures of solvents for use according to the present invention are e.g. a 50:50 mixture of ethanol and diacetone alcohol and a 50:50 mixture of glycol monomethyl ether and diacetone alcohol.

Suitable sensitizing dyes for photoconductive zinc oxide which can be incorporated into a photoconductive composition according to the present invention can be selected from the group of organic dyes, e.g. triarylmethane dyes, xanthene dyes, acridine dyes, cyanine dyes, indamine dyes, oxazine dyes, thiazine dyes and diazine dyes.

As cyanine dyes and other sensitizing methine dyes for photoconductive zinc oxide are more particularly mentioned merocyanine dyes, carbocyanine dyes, rhodacyanine dyes, oxonol dyes, styryl dyes and merostyryl dyes.

Further are mentioned dyes with non-ionoid chromophoric groups such as azo dyes, formazane dyes, and anthraquinone dyes.

Photoconductive recording elements sensitized according to the present invention can be prepared by coating a suitable support with a dispersion of the inorganic photoconductive substance in a solution of the binding agent, in an aqueous medium, e.g. in an alkaline aqueous medium. The sensitizing dye can be added (e.g. in solution) to such dispersion prior to or after its application to the support and the low vapour-pressure solvent can be added before, together with, or after the dye but so as to be present during the drying. Photoconductive alkaline coating compositions containing an inorganic photoconductive substance are described e.g. in the United Kingdom patent specification 881,613 filed May 24, 1960 by S. D. Warren Company and our published Dutch patent specifications 6608814 and 6608815 both filed June 24, 1966.

The invention includes photoconductive recording layers containing traces of a low vapour-pressure solvent as herein defined, and in particular includes any such layer comprising an inorganic photoconductive substance dispersed in a binder, a sensitizing dye for such substance and traces of a said low vapour-pressure solvent for such dye.

The following Table 1 illustrates the improvement obtained by using a very great variety of sensitizing agents incorporated in a photoconductive zinc oxide composition, using in addition to water, a solvent or mixture of solvents at least one of which has a low vapour-pressure as compared to one having a relatively high vapour-pressure (evaporation period lower than 35).

The photoconductive composition is prepared as follows:

20 g. of photoconductive zinc oxide, 25 ml. of water, 5.33 g. of poly(vinyl acetate/crotonic acid) (94.4/5.6) dissolved in a mixture of 25 ml. of water and 5.33 ml. of concentrated ammonium hydroxide are ground for 2 hours in a ball-mill. Thereupon the dyes listed in Table 2 are added to the ground composition and intimately mixed therewith. The dyes are added in an amount of 0.5 mg. per g. of zinc oxide as a 0.1% by weight solution in the indicated solvents.

The differently sensitized compositions are coated onto a baryta coated paper of 90 g. per sq. m. at a ratio of 25 g. of zinc oxide per sq. m.

After drying at room temperature the recording layers under the same conditions are charged by a negative corona discharge. To compare the light-sensitivity of the recording layers they are exposed for 15 sec. through a step wedge with a constant 0.1 using an incandescent lamp of 450 watt irradiating the recording layer with 2280 lux.

The exposed layers are in the same circumstances developed with an electrophoretic developer of the positive type.

In the obtained print of the step-wedge the number of steps not covered with developing powder is a measure for the light-sensitivity of the recording material.

TABLE 1

| Number of the structural formula of the dye listed in Table 2 | Number of steps not covered with developing powder (the solvent or mixture of solvents used for incorporating the dye is indicated with a capital the significance of which is explained in the legend) |
| --- | --- |
| 1 | 16(A); 10(B); 8(H) |
| 2 | 13(A); 17(C); 12(D); 12(E); 14(F); 13(G); 2(J) |
| 3 | 15(A); 10(B); 5(J) |
| 4 | 14(A); 8(C); 2(J) |
| 5 | 15(A); 9(B); 4(L) |
| 6 | 16(A); 20(C); 11(H) |
| 7 | 21(A); 13(B); 10(L) |
| 8 | 24(A); 13(L) |
| 9 | 27(A); 16(B); 9(L) |
| 10 | 10(A); 3(B); 0(L) |
| 11 | 11(A); 1(K) |
| 12 | 11(A); 3(B); 1(J) |
| 13 | 14(A); 7(C); 2(J) |
| 14 | 14(A); 4(B); 3(J) |
| 15 | 14(A); 11(C); 5(J) |
| 16 | 19(A); 7(J) |
| 17 | 16(A); 10(B); 3(J) |
| 18 | 20(A); 15(C); 9(J) |
| 19 | 17(A); 6(J) |
| 20 | 10(A); 0(L) |
| 21 | 11(A); 0(L) |
| 22 | 8(A); 2(B); 0(J) |
| 23 | 12(A); 6(C); 0(J) |
| 24 | 8(A); 2(C); 0(L) |
| 25 | 19(A); 13(B); 8(L) |
| 26 | 11(A); 4(C); 0(L) |
| 27 | 6(A); 1(C); 0(L) |
| 28 | 4(A); 0(L) |
| 29 | 8(A); 1(J) |
| 30 | 12(D); 14(E); 14(F); 13(G); 4(J) |

(A)=diacetone alcohol.
(B)=tetrahydrofurfuryl alcohol.
(C)=ethylene glycol monoacetate.
(D)=methyl glycol acetate.
(E)=ethyl glycol acetate.
(F)=ethanol/diacetone alcohol (50 : 50 by volume).
(G)=ethylene glycol monomethyl ether/diacetone alcohol (50 : 50 by volume).
(H)=Water.
(J)=ethanol.
(K)=methanol.
(L)=ethylene glycol monomethyl ether.

TABLE 2

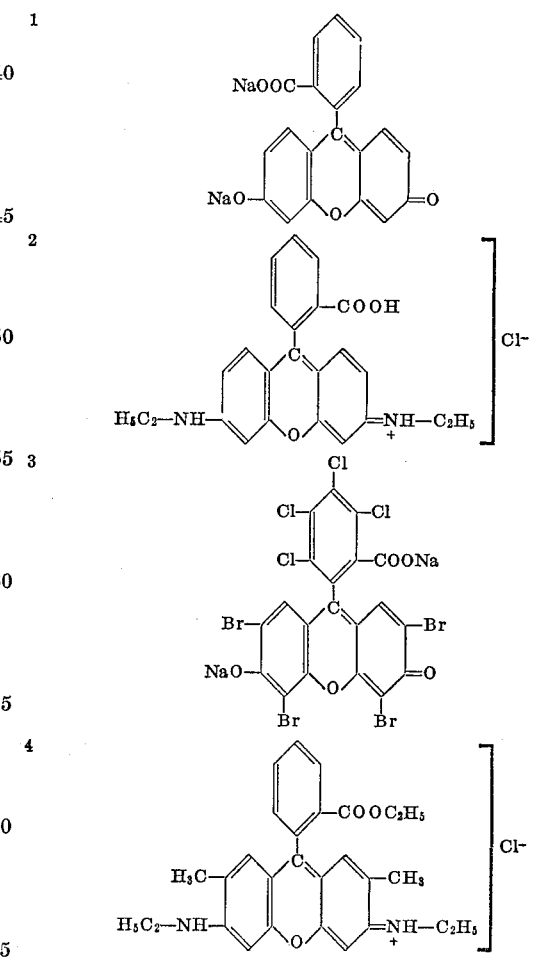

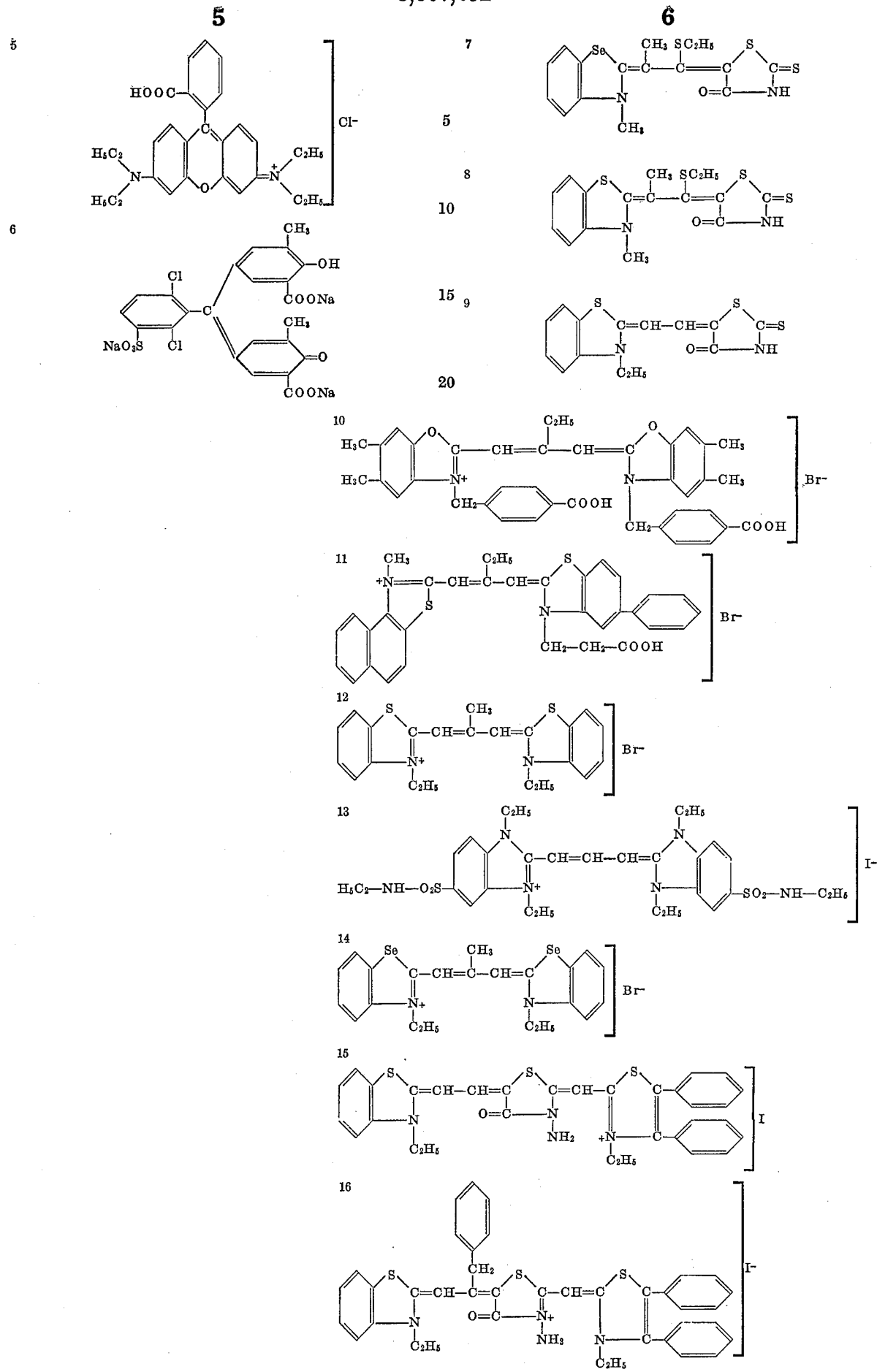

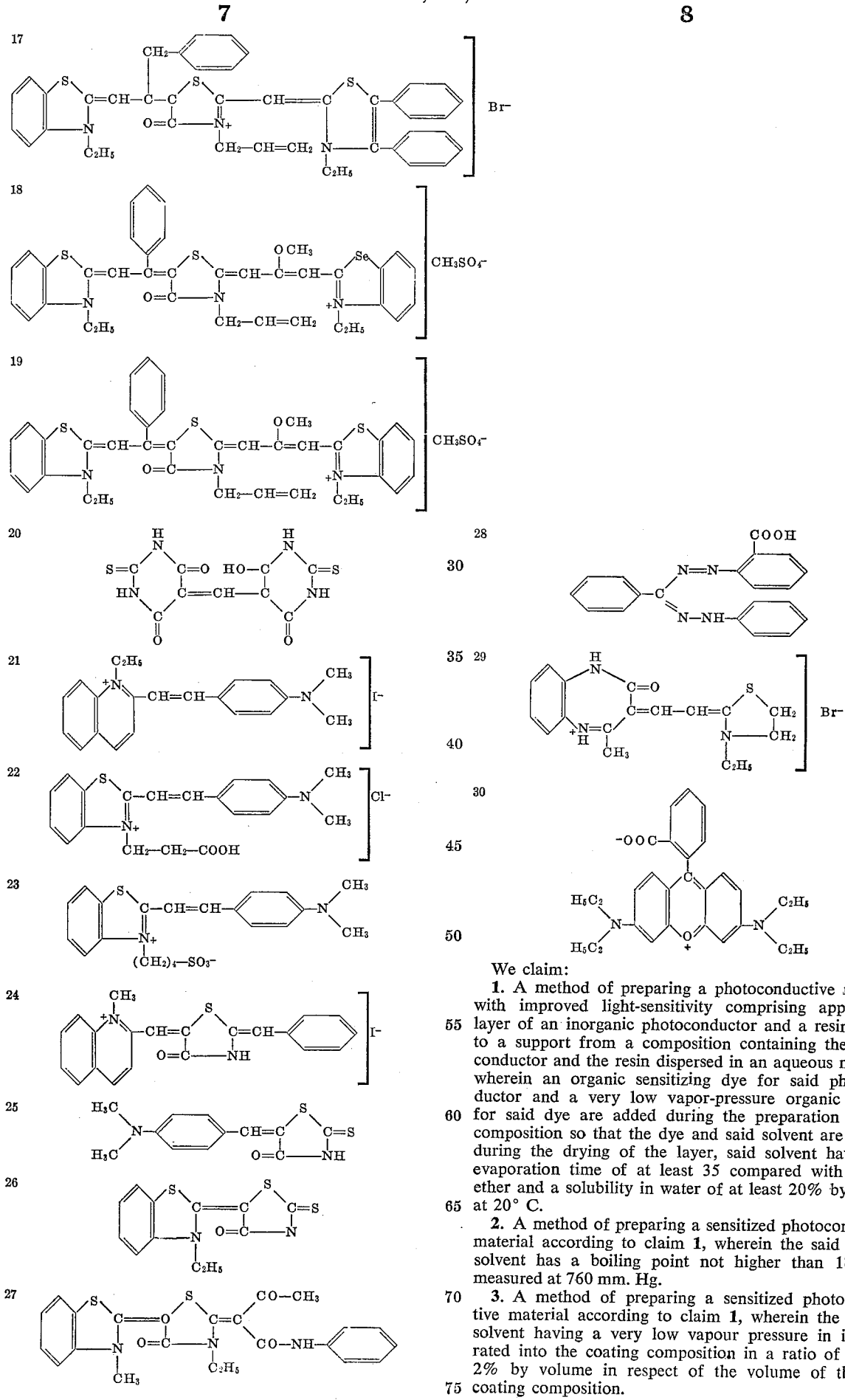

We claim:
1. A method of preparing a photoconductive material with improved light-sensitivity comprising applying a layer of an inorganic photoconductor and a resin binder to a support from a composition containing the photoconductor and the resin dispersed in an aqueous medium, wherein an organic sensitizing dye for said photoconductor and a very low vapor-pressure organic solvent for said dye are added during the preparation of said composition so that the dye and said solvent are present during the drying of the layer, said solvent having an evaporation time of at least 35 compared with diethyl ether and a solubility in water of at least 20% by weight at 20° C.

2. A method of preparing a sensitized photoconductive material according to claim 1, wherein the said organic solvent has a boiling point not higher than 180° C., measured at 760 mm. Hg.

3. A method of preparing a sensitized photoconductive material according to claim 1, wherein the organic solvent having a very low vapour pressure in incorporated into the coating composition in a ratio of at least 2% by volume in respect of the volume of the total coating composition.

4. A method of preparing a sensitized photoconductive material according to claim 1, wherein the organic solvent is diacetone alcohol.

5. A method of preparing a sensitized photoconductive material according to claim 1, wherein the organic solvent is tetrahydrofurfuryl alcohol.

6. A method of preparing a sensitized photoconductive material according to claim 1, wherein the organic solvent is ethylene glycol monoacetate.

7. A method of preparing a sensitized photoconductive material according to claim 1, wherein the organic solvent is methyl glycol acetate.

8. A method of preparing a sensitized photoconductive material according to claim 1, wherein the organic solvent is ethyl glycol acetate.

9. A method of preparing a sensitized photoconductive material according to claim 1, wherein the organic solvent is a 50:50 by volume mixture of diacetone alcohol and ethanol.

10. A method of preparing a sensitized photoconductive material according to claim 1, wherein the organic solvent is a 50:50 by volume mixture of diacetone alcohol and ethylene glycol monomethylether.

11. A method of preparing a sensitized photoconductive material according to claim 1, wherein zinc oxide is used as the inorganic photoconductor.

12. A method of preparing a sensitized photoconductive material according to claim 1, wherein the photoconductive substance is dispersed in an aqueous alkaline medium.

References Cited
UNITED STATES PATENTS

| | | | |
|---|---|---|---|
| 3,052,540 | 9/1962 | Grieg | 96—1 |
| 3,203,795 | 8/1965 | Schaum et al. | 96—1 |
| 3,345,161 | 10/1967 | Mamnino et al. | 96—1.7 |

GEORGE F. LESMES, Primary Examiner

J. C. COOPER III, Assistant Examiner

U.S. Cl. X.R.

96—1.5, 1.6, 1.7